United States Patent [19]

Crapo

[11] E Re. 31,325

[45] Reissued Jul. 26, 1983

[54] STEPPING AC LINE VOLTAGE REGULATOR

[75] Inventor: Roland L. Crapo, Bristol, Conn.

[73] Assignee: The Superior Electric Company, Bristol, Conn.

[21] Appl. No.: 326,580

[22] Filed: Dec. 2, 1981

Related U.S. Patent Documents

Reissue of:

[64] Patent No.: 4,178,539
Issued: Dec. 11, 1979
Appl. No.: 930,763
Filed: Aug. 3, 1978

[51] Int. Cl.[3] ..... G05F 1/30

[52] U.S. Cl. ..... 323/263

[58] Field of Search ..... 323/255, 258, 259, 263, 323/340, 344

[56] References Cited

U.S. PATENT DOCUMENTS

| | | | |
|---|---|---|---|
| 3,600,668 | 8/1971 | Goldberg | 323/263 |
| 3,611,117 | 10/1971 | Schneider | 323/263 |
| 3,621,375 | 11/1971 | Kettler | 323/344 |
| 3,970,918 | 7/1976 | Cooper | 323/258 |

*Primary Examiner*—A. D. Pellinen

[57] ABSTRACT

A regulator for providing two different steps of bucking and two different steps of boosting correcting voltages to maintain the value of its output voltage within a selectable range with the regulator effecting each step correction for the next half-cycle based on the peak output voltage of the last half-cycle.

15 Claims, 8 Drawing Figures

STEPPING AC LINE VOLTAGE REGULATOR

Matter enclosed in heavy brackets [ ] appears in the original patent but forms no part of this reissue specification; matter printed in italics indicates the additions made by reissue.

While most electrical devices are capable of functioning properly over a relatively wide range of line voltages, there are some which require a narrow range. Though the line voltage is usually maintained within such a narrow range, it has become increasingly common for the line voltage to deviate substantial beyond such a range. The need has accordingly increased for a relatively low cost voltage regulator that is capable of maintaining a relatively narrow voltage range, on the order of perhaps plus or minus four volts from a nominal 115 volt output or plus or minus 8 volts for a 230 volt nominal output when the line voltage deviates from the nominal value by essentially no greater than plus or minus 15%.

It is accordingly an object of the present invention to provide a line voltage regulator that while capable of accepting quite large variations in values of line voltage from a nominal value and yet provide an output voltage within a narrow range, is quite economical to produce and which is reliable and durable in operation.

Another object of the present invention is to achieve the above object with a voltage regulator that is quick acting by being capable of effecting a correction for each half-cycle at the beginning of each half-cycle if the prior half-cycle peak voltage is not within the selected output range and in which the correction consists of one of either two voltage increasing steps or of two decreasing steps.

A further object of the present invention is to achieve the above objects with a regulator that though employing a plurality of integrated circuit components, is quite efficient and minimizes the generation of distortion in the output voltage.

In carrying out the present invention, there is provided a voltage regulator which has a secondary transformer winding connected in one line between an input and an output terminal. The transformer has four primary windings and each of which is capable of being individually energized by causing its associated switching means to be conducting. For either maximum correction, only one winding is energized to provide the correcting voltage in the secondary winding. However, for an intermediate correction, not only is the one winding energized but also another winding is energized therewith in series to double the number of primary winding turns and produce a correcting voltage that is half the one winding correcting voltage. When no correction voltage is necessary, two windings are connected in a manner which minimizes their reflected impedence in the secondary winding to thereby minimize the voltage drop attributable to the regulator.

Each switching means for energizing a winding includes specifically at least one semiconductor bidirectional thyristor or "TRIAC" which assures that at the end of each half-cycle, conduction through a winding will cease and not occur for the next half-cycle unless a triggering signal is applied to the TRIAC. The present regulator senses the peak value of the output voltage and when it departs from the selected output range during a half-cycle, provides a correcting signal just prior to the next half-cycle for rendering the proper TRIACs conducting. The capability of producing the correcting signal however is limited to a very short duration which minimizes the possibility of spurious signals dictating false corrections.

Other features and advantages will hereinafter appear.

Figure 1:
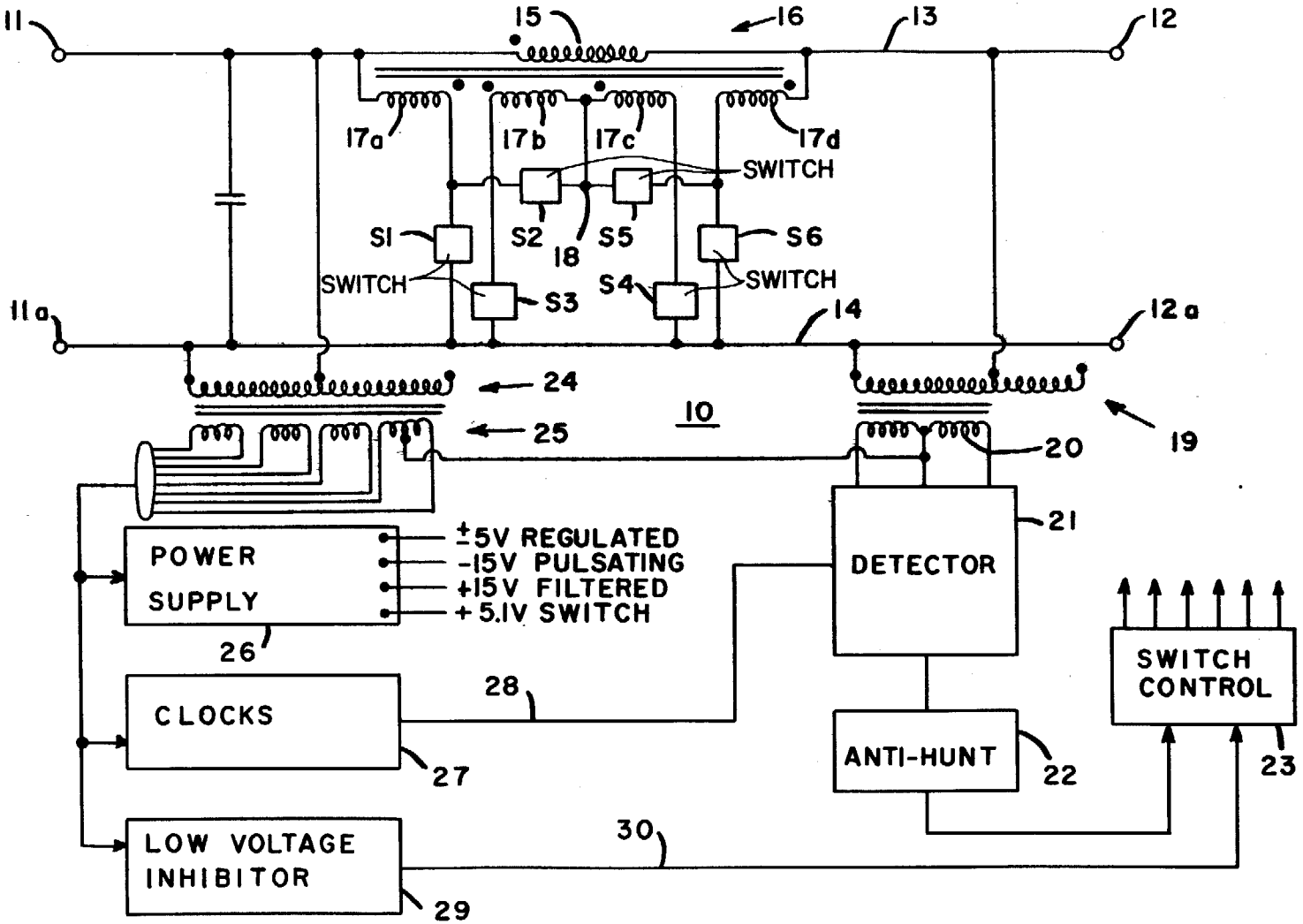
FIG. 1 is a block and schematic diagram of the stepping regulator of the present invention.

Referring to the drawing, FIG. 1, the regulator of the present invention is generally indicated by the reference numeral 10 and includes a pair of input terminals 11 and 11a and a pair of output terminals 12 and 12a which form two conducting lines 13 and 14. Connected in series on line 13 is a secondary winding 15 of a transformer 16 having four primary windings 17a, 17b, 17c and 17d. All windings 17a–17d have the same number of turns and have the polarity indicated on the drawing.

By energization of selected primary windings, the regulator is capable of increasing or boosting the input voltage by about plus 13.6 percent or about plus 6.8 percent of the input voltage to obtain one desired rated output voltage of 115 volts for example within plus or minus 3.5 percent; essentially not altering the input voltage if the output voltage is within the rated value; or decreasing or bucking the input voltage by a step of about minus 6.8 percent or about minus 13.6 percent of the output voltage. Thus, the present regulator accepts input voltages within a range of 100–135 volts and maintains the output voltage within the above-noted plus or minus 3½ percent range from the selected output value.

The winding 17a and a switch S1 are connected in series between the two lines 13 and 14 as is the winding 17d and a switch S6. The adjacent ends of windings 17b and 17c are connected at a common junction 18 while the other end of winding 17b is connected to line 14 through switch S3 and the other end of winding 17c is also connected to line 14 through switch S4. The common junction 18 is connected through switch S2 to the end of winding 17a while switch S5 connects the common junction 18 to the end of winding 17d.

In the operation of the regulator, the maximum increase or boost requires that only switch S1 be closed so that the winding 17a induces a voltage in the winding 15 that is added to the input voltage to increase it by plus 13.6 percent. An increase of 6.8 percent is achieved by closing switches S2 and S3 which energizes both windings 17a and 17b. However, as these windings have the polarity indicated on the drawing and turns ratio indicated above, the turns of the windings 17a and 17b are placed in series to induce a voltage in the winding 15 which is one half that which either could individually produce and which thus results in a 6.8 percent increase of the input voltage. For an input voltage having a value within the range of the rated output voltage, only switches S3 and S4 are closed which does not energize any windings at all. The closing of switches S3 and S4 short circuits windings 17b and 17c which minimizes their reflected impedence to winding 15.

For a 6.8 percent decrease, switches S4 and S5 are closed, energizing windings 17c and 17d in series to double the number of turns over that of one winding with the net effect being the inducing of a bucking voltage which provides a 6.8 percent decrease. For the maximum decrease of 13.6 percent, only switch S6 is closed so that only winding 17d provides the correcting voltage for altering the input voltage.

A detector transformer 19 is connected across the output terminals 12 and 12a to produce at its center tapped secondary winding 20, a voltage that is a set fraction of the value of the output voltage. A detector circuit, generally indicated by the block 21 in FIG. 1, and more specifically shown in FIG. 2, senses the peak voltage of each half-cycle and provides at its output a digital signal slightly before the end of each half-cycle if correction is needed. The digital signal, if present, causes the switches to have their conduction changed to that of an adjacent step in the correction sequence for the next half-cycle with respect to the correction applied in the previous half-cycle. The regulator accordingly changes the correction for each half-cycle but the change is only from one correction to an adjacent correction or step, if a change is made at all.

Figure 3:
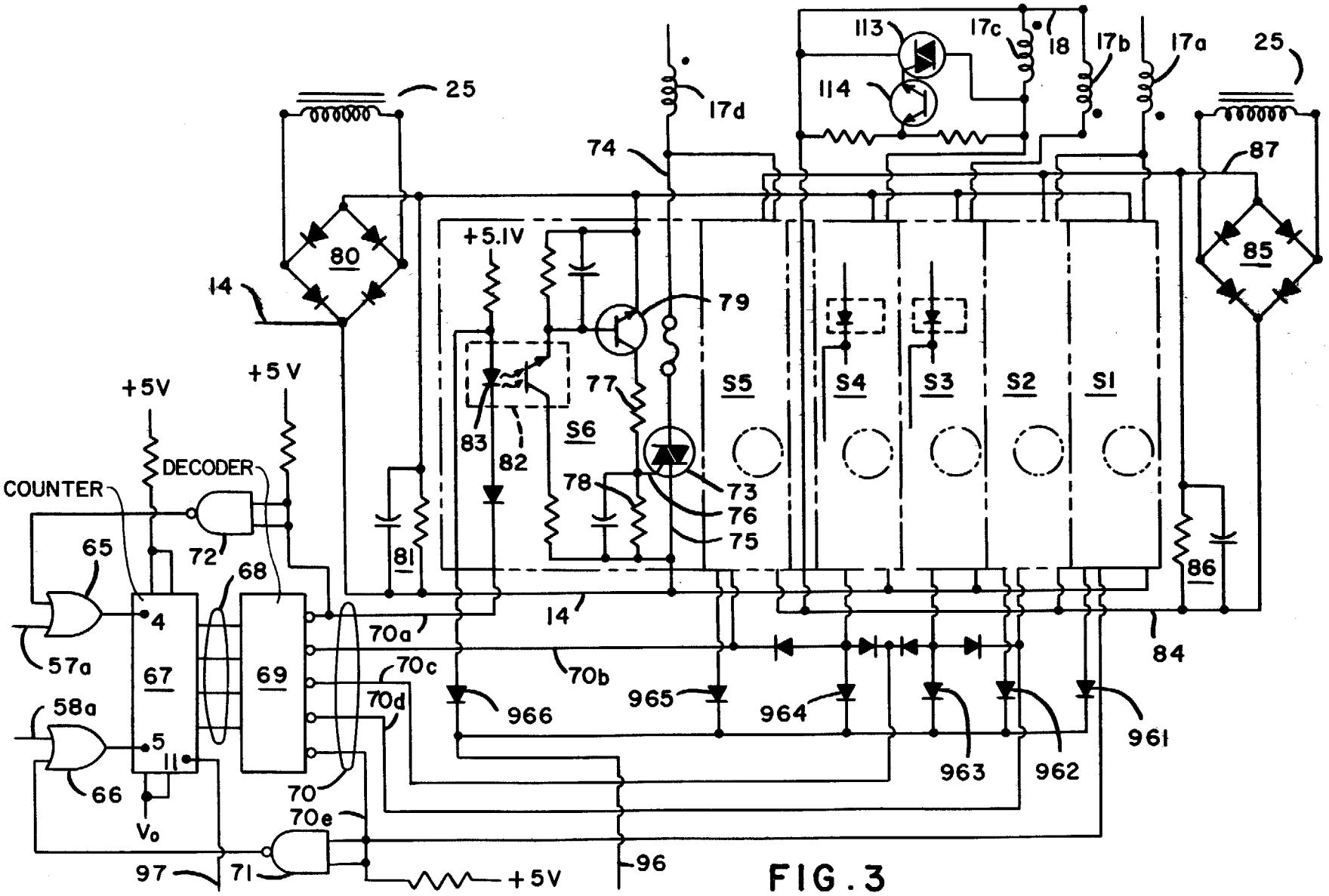
FIG. 3 is an electrical schematic diagram of the switch control circuit.
Figure 8:
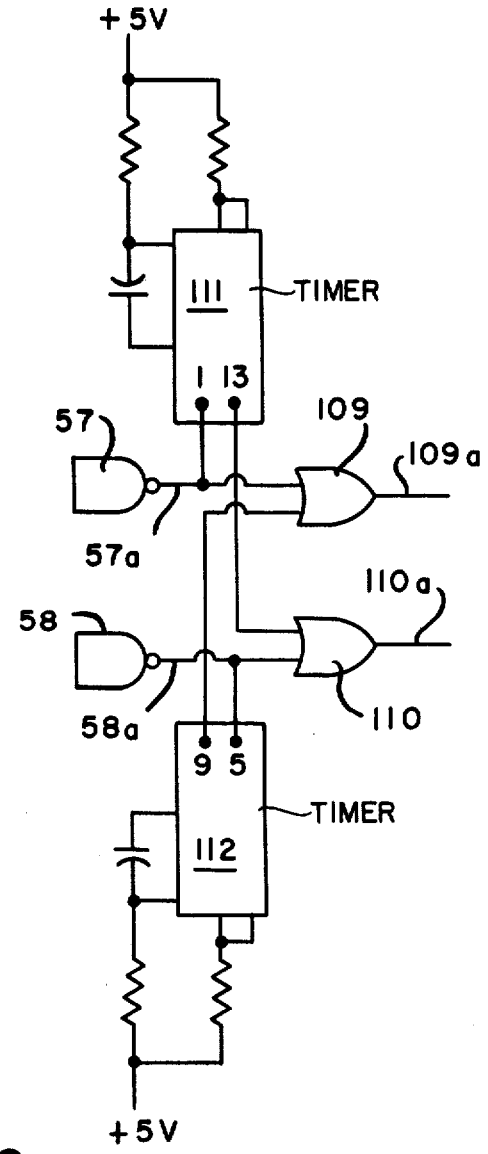
FIG. 8 is an electrical schematic diagram of the anti-hunt circuit.

The digital signal from the detector 21 may be applied through an anti-hunt circuit 22, specifically shown in FIG. 8, to switch control circuit 23 which causes conduction of the proper switches with the latter circuit being shown in FIG. 3.

Connected across the input terminals 11 and 11a is another transformer 24 having a plural tap secondary winding 25 for providing voltage to a power supply circuit 26, clocks 27 and a low voltage inhibitor 29. The power supply furnishes at least the indicated values of power to the circuits of the regulator while the clocks 27 supply on a plural lead 28 timing signals with respect to the end of each half-cycle to the detector 21. The low voltage inhibitor 29 supplies a signal on a lead 30 to the switch control which inhibits conduction through switches S1, S2, S5 and S6 that provide a correcting voltage in the event that the input voltage decreases below a selected value, such as 75 volts for a 115 volt output while causing switches S3 and S4 to become conducting.

Figure 2:
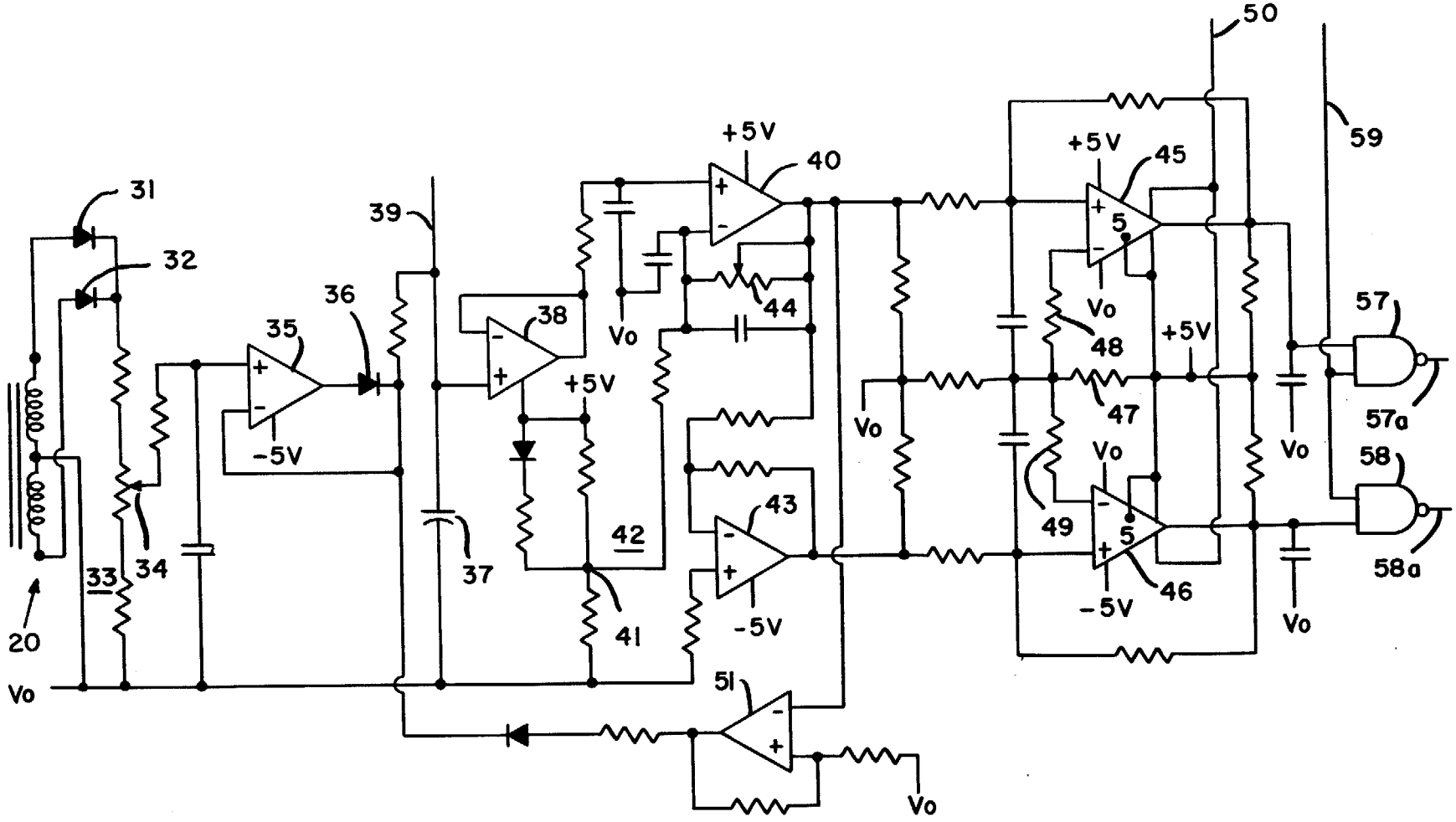
FIG. 2 is an electrical schematic diagram of the detector circuit.

Referring to the detector circuit 21 shown in FIG. 2, the three leads from the secondary winding 20 are connected to diodes 31 and 32 in a manner which provides full wave rectification of the fraction of the output voltage produced in the secondary winding 20 across a potential divider 33. The transformer 19 and potential divider 33 are composed of components that are selected to have values which provides a peak voltage of approximately 1.5 volts DC at an adjustable tap 34 when the rated output voltage occurs. The tap 34 in turn is connected to the plus terminal of an operational amplifier 35 connected as a unity gain amplifier. The output of the amplifier 35 is directed through a diode 36 to one side of a capacitor 37 and both are jointly connected to the plus terminal of an operational amplifier 38. The negative terminal of the capacitor 37 is connected to the center tap of the secondary winding 20, denoted Vo. The diode 36 prevents discharging of the capacitor 37 through the amplifier 35. The plus terminal of the amplifier 38 accordingly has the instantaneous charge across the capacitor 37 applied thereto. The amplifier 38 is also connected as a unity gain amplifier and basically serves as a buffer to maintain the capacitor 37 from discharging except when discharged through a lead 39 connected to the clock circuit 27 which occurs at the end portion of each half-cycle.

The capacitor 37 is thus charged to a peak voltage value which is related to the peak value of the output voltage for each half-cycle of the input voltage and accordingly causes the output of the operational amplifier 38 to have a voltage that is proportional to the peak value. This output voltage is then applied to a plus terminal of an operational amplifier 40 whose minus terminal is connected to a junction 41 which is a part of a voltage divider 42 connected between ground and the plus terminal of the regulated 5 volt power source provided by the power supply circuit 26.

The amplifier 40 produces an output voltage that is directly related to the algebraic difference between the amplifier 38 output voltage and a constant regulated voltage. If the value of the voltage at the plus terminal of the operational amplifier 40 is greater than that at the minus terminal, the output of amplifier 40 becomes positive while if the plus terminal voltage is less than the regulated voltage, then the output voltage becomes negative. The output of amplifier 40 is also connected to a negative terminal of an operational amplifier 43 that has its positive terminal connected to ground. If the voltage from amplifier 38 equals the voltage from junction 41, then the output voltage of amplifiers 40 and 43 are accordingly each zero or ground. When the amplifier 40 has a positive output voltage, indicating that the value of the output voltage of the regulator is too high and decrease in the correction voltage is required, the output of amplifier 43 is negative. When the output of amplifier 40 is negative, causing the output of amplifier 43 to be positive, an increase in the output voltage is necessary to maintain the desired value.

An adjustable resistor 44 connected between the output of amplifier 40 and its minus input terminal is employed to alter the gain of amplifier 40 and hence the sensitivity of the system as it changes the ratio of the value of output voltage of amplifier 40 to the algebraic difference between its input voltages.

Amplifier's 40 output is also connected to the plus terminal of a voltage comparator 45, which may be an integrated circuit type LM 311N, while the output from amplifier 43 is connected to the plus terminal of an identical voltage comparator 46. Each voltage comparator further receives at its negative terminal, a positive value of voltage that is obtained from the regulated 5 volt source through a resistor 47 and through resistors 48 and 49 to comparators 45 and 46 respectively. The value of the regulated voltage at the negative input of each comparator is essentially a positive ½ volt.

Each of the comparators further includes a strobe 5 terminal that receives a low to high voltage change on a clock circuit lead 50 and 6.5 milliseconds after the beginning of each half-cycle. During this period, the strobe voltage, by being low, maintains the output voltage of each comparator at essentially zero. When the strobe voltage change is applied, however, the output of comparator 45 shifts to a positive 5 volts if the output voltage of the regulator 10 is required to be decreased in the next half-cycle in order to be within its rated value. The output of comparator 46 becomes +5 volts, if the output voltage of the regulator is required to be increased. If no change is needed, then both outputs are zero.

The detector circuit 21 accordingly provides a change in a digital signal indicating if the output voltage requires correction in the next half-cycle while the absence of a digital signal produces no change during the next half-cycle and the same corrective voltage that was applied in the previous half-cycle is again applied to the present half-cycle.

As the detector circuit 21 basically functions with analog values of voltages except for the digital signal from the comparators, the producing of a digital signal at the end of the half-cycle basically is determined by the value of voltage across the capacitor 37 towards the end of the half-cycle rather than at the mid-point of the half-cycle when the capacitor 37 has its maximum charge. During this time interval, the voltage across the capacitor is decaying from its peak value which causes positive values of voltage at the output of amplifier 40 to decrease. For negative voltage values at the output of amplifer 40, the effect is an increasing in the value of output voltage of the amplifier 43. In order to produce the same effect of a decreasing positive output voltage during this time interval from both of the amplifiers 40 and 43, a supplementary charging circuit is employed to cause decreasing of the positive voltage at the output amplifier 43 while permitting amplifier's 40 output voltage when positive to continue to decrease. As the comparators 45 and 46 utilize positive values of voltages, the providing of a decreasing voltage for comparison when the strobe signal is present rather than an increasing voltage minimizes the possibility of indecisive operation of the comparators.

The supplementary charging circuit includes an operational amplifier 51 having its negative terminal connected to the output of operational amplifier 40 while its plus terminal is connected to ground. The output of the amplifier 51 is connected to the output of amplifier 35 and hence through a resistor to the capacitor 37 and the plus terminal of amplifier 38. For a boosting condition, when the output voltage of amplifier 43 is positive and would tend to increase in value due to capacitor discharge, the output of amplifier 51 is also positive and provides an additional charging current to the capacitor 37. The extent of the added charge is made to be essentially the extent of the decrease in the value of positive output voltage from the amplifier 40 during this same time interval. The amplifier 51, by having a zero output voltage for positive values of amplifier's 40 output voltage, does not in this situation effect the charge of the capacitor 37.

Figure 4:
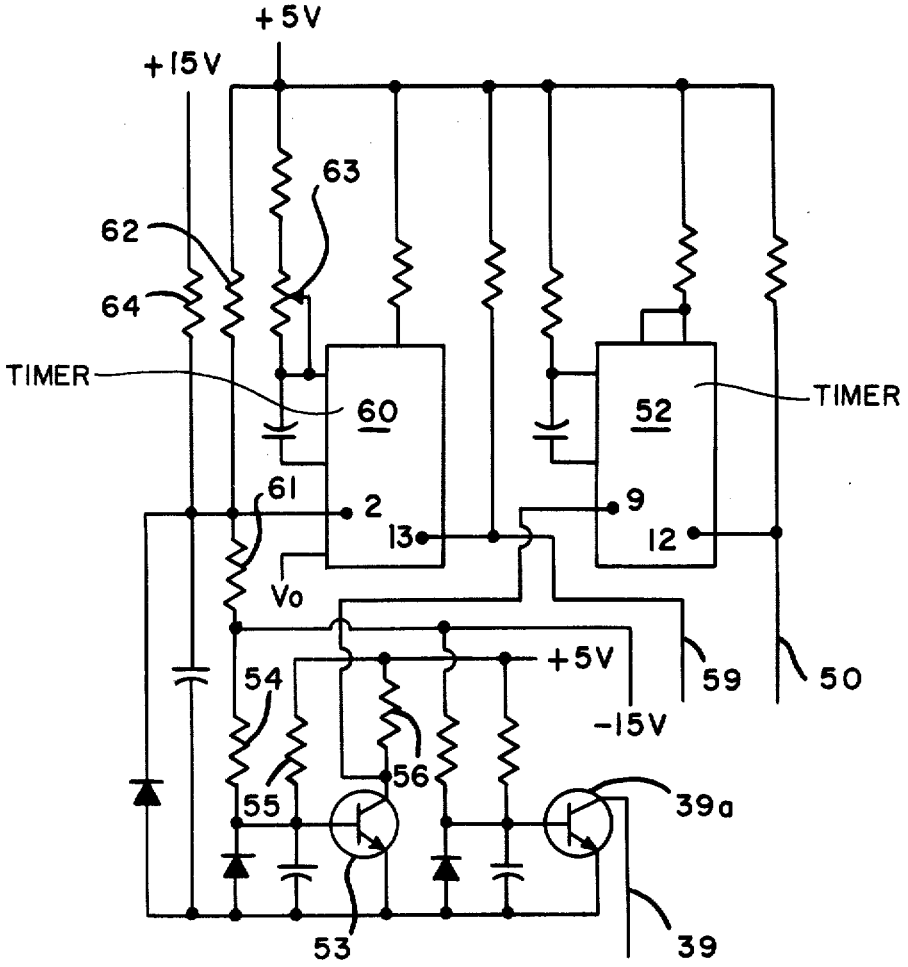
FIG. 4 is an electrical schematic diagram of the clock circuit.

The clock that provides the strobe signal to the comparators 45 and 46 on the lead 50 is specifically shown in FIG. 4 and includes a monostable connected timer 52, which may be one half a type 74221 integrated circuit, connected to receiver on its 9 terminal a high to low voltage slightly before a zero crossing of the input voltage which shifts the timer output on its 12 terminal to a zero logic level. The resistors and capacitors connected to the timer 52 are set to maintain the zero output level for a duration of about 6.5 milliseconds after the triggering signal at which time the 12 terminal output shifts to the high voltage to provide the strobe pulse. The output remains high until the next triggering signal appears at which time it shifts to low for the next 6.5 milliseconds.

The zero crossing triggering signal to the 9 terminal of timer 52 is obtained from a connection to the collector of a transistor 53 which receives a −15 volt peak pulsating full wave rectified voltage (indicated as −15 v) applied through a resistor 54 to its base. The base and the collector of transistor 53 are both connected through resistors 55 and 56 respectively to the +5 regulated source. Accordingly, towards the end of a half-cycle, the value of the negative voltage on the base decreases and eventually becomes less than the positive voltage from the +5 v regulated voltage. When the base voltage becomes approximately 0.7 volts positive, the transistor 53 conducts, providing the positive to negative triggering signal to the timer 52. The triggering signal is removed during the beginning of the next half-cycle when the base voltage drops to less than 0.7+ volts.

It should also be noted in FIG. 4 that a transistor 39a is connected similarly as the transistor 53 and the lead 39 is connected to its collector for effecting discharging of the capacitor 37 whenever the value of the voltage on the base of transistor 39a becomes essentially plus 0.7 volts.

The output from the comparator 45 constitutes one input to a NAND gate 57 (FIG. 2) while the output of comparator 46 constitutes one input to another NAND gate 58. The other input of each NAND gate is connected to a lead 59 on which a timing pulse appears with the lead 59 being connected to the output terminal of a monostable timer 60, (FIG. 4) that constitutes the other half of the integrated circuit that includes the timer 52. The gates 57 and 58 are inverting and timing gates and utilized to provide a digital output signal from the detector circuit 21 to the switch control circuit 23 consisting of a low to high voltage change when a change in correction is required with the signal appearing about 350 microseconds before the end of the half-cycle. This short duration minimizes the interferance with a conducting TRIAC while removing the triggering signal from such a conducting TRIAC in sufficient time to enable the conducting TRIAC to become non-conducting at zero crossing.

The timer 60 has a triggering 2 terminal connected through a resistor 61 to the −15 v pulsating voltage source and through a resistor 62 to the +5 v regulated source. These two voltages are algebraically added and towards the end of the half-cycle, the voltage at the 2 terminal shifts from negative to positive with this change triggering the timer 60 to cause the output voltage on the lead 59 to shift from low to high. The duration of the high voltage is adjustable by adjustment of a resistor 63 which is set to terminate the pulse about 350 microseconds before the end of the half-cycle. This adjustment enables variations in the component tolerances to be accommodated.

The −15 v pulsating D.C. voltage is derived from the input voltage (more fully described hereinafter in connection with the power supply shown in FIG. 6) and hence varies in magnitude therewith with which in turn would render the time in the half-cycle when the triggering voltage of timer 60 shifts to positive, commensurate with the value of the input voltage. To minimize such shifting, the 2 trigger terminal of timer 60 is also connected through a resistor 64 to a +15 v filtered, but not regulated, source of power (also shown in FIG. 6). This connection varies the positive voltage at the 2 trigger terminal in accordance with the value of input voltage and thus as both vary with the input voltage they tend to maintain the same time in the half-cycle when the timer 60 is triggered over different values of input voltage at the terminals 11 and 11a.

The signals from the gates 57 and 58 are then introduced to the anti-hunt circuit 22, specifically shown in FIG. 8 and hereafter more fully described, and which may prevent passing of the signals to the switch control 23. If the anti-hunt circuit 22 does not inhibit the signals, when the output of gate 57 is directed on a lead 57a to the switch control circuit shown in FIG. 3 to one input of an OR gate 65 while the output of the gate 58, on a lead 58a, is directed to an input of another OR gate 66. The inputs of gates 65 and 66 constitute the command receiving terminals for the switch control circuit 23 that is specifically shown in FIG. 3.

The output of the gate 65 is connected to the count down increment 4 terminal of a decade counter 67 which may be an integrated circuit type 74192 while the output of the gate 66 is connected to the count up increment 5 terminal of the counter. Thus a pulse, a change in voltage from low to high from the gate 57 through the gate 65 to the count down terminal will cause the counter to decrease its count by one from its current count while a similar pulse from the gate 58 through the gate 66 will cause the counter to increase its count by 1. In the absence of either pulse, the counter count remains the same.

The count of the counter 67 appears, as BCD information on a plurality of leads 68, and is directed to the input of a decoding circuit 69 which may be an integrated circuit type 74145 with the output of the decoding circuit appearing on leads 70. The leads 70 are connected to supply triggering signals to the switches S1 through S6. For a counter 67 numerical count of 3, the lead 70a has a low voltage trigger signal which causes conduction of switch S6. For a count of 4, the lead 70b has a low trigger signal for causing conduction of switches S5 and S4 while for a count of 5, only lead 70c is low for triggering switches S4 and S3. For the intermediate boosting condition, the counter 67 has a count of 6 which through the decoding circuit 69 causes lead 70d to have a low triggering voltage which renders switches S2 and S3 conducting. Switch S1 is rendered conducting when the counter has a count of 7 and the decoding circuit 69 only permits the lead 70e to have the low triggering voltage.

The counter 67 is prevented from exceeding its 7 count by a NAND gate 71 that has both its inputs connected to the lead 70e. A low signal on the lead 70e caused by the counter having a 7 count, causes the output of gate 71 to have a high logic level and this level is applied as the other input to the OR gate 66. When so applied, it maintains the output of the OR gate 66 high which inhibits the passage therethrough of a high to low voltage change from the gate 58. This continued signal thus prevents further incrementing of the counter 67 beyond its 7 count. Similarly, a NAND gate 72 that has its two inputs connected to the lead 70a and its output connected to the other input of the OR gate 65, prevents the counter 67 from receiving signals that would decrement it below its count of 3.

The switches S1–S6 are identical and referring to the switch S6, conduction through the winding 17d is controlled by conduction or non-conduction of a TRIAC 73 having one side 74 connected to the end of winding 17d while its other side 75 is connected to the line 14. A gate 76 of the TRIAC is connected to the junction of series resistors 77 and 78 which in turn are both connected in series with a transistor 79. The components 77, 78, and 79 are connected in series across a fairly constant value of DC voltage of about 8 volts from a full wave rectifier 80 and filter components 81. The base of transistor 79 is connected to the emitter of an optical isolator 82 which may be an integrated circuit type TIL 118. The emitter and collector of the isolator 82 are interconnected with the about 8 volt power supply while its photo diode 83 is connected in series between a 5.1 volt regulated power supply (shown specifically in FIG. 7) and the lead 70a.

A triggering signal on the lead 70a, which is a low voltage, causes conduction through the diode 83 which renders the optical isolator 82 conducting through its emitter-collector path. The base of transistor 79 accordingly has its base voltage changed from low to high effecting conduction in its emitter-collector path which provides a ground to negative voltage signal on the gate of TRIAC 73. The TRIAC conducts and continues conduction for the remainder of the half-cycle. In the absence of a low signal on the lead 70a, the optical isolator 82 and transistor 79 do not conduct which prevents the applying of a triggering signal to the TRIAC 73. The use of the optical isolator for triggering the TRIAC, provides electrical isolation between the power controlling elements and the logic circuits.

The other switches S5 through S1 are shown in block form as they are identical to the switch S6. The switches S6, S4, S3 and S1 have their TRIACs connected between the indicated windings and the line 14 and receive their gate power from the power supply having components 80 and 81. However, the TRIACs of switches S5 and S2 while having one end connected to the winding ends shown have their other ends connected in parallel to a lead 84 that as shown is connected to the common junction 18. The lead 84 constitutes the ground side of another gate power supply consisting of a full wave rectifier 85 and filter components 86 with the negative side thereof being in a lead 87 that is also connected only to switches S5 and S2. It has been found convenient to provide the additional power source for the switches S5 and S2 as they are not directly connected to the line 14.

Figure 5:
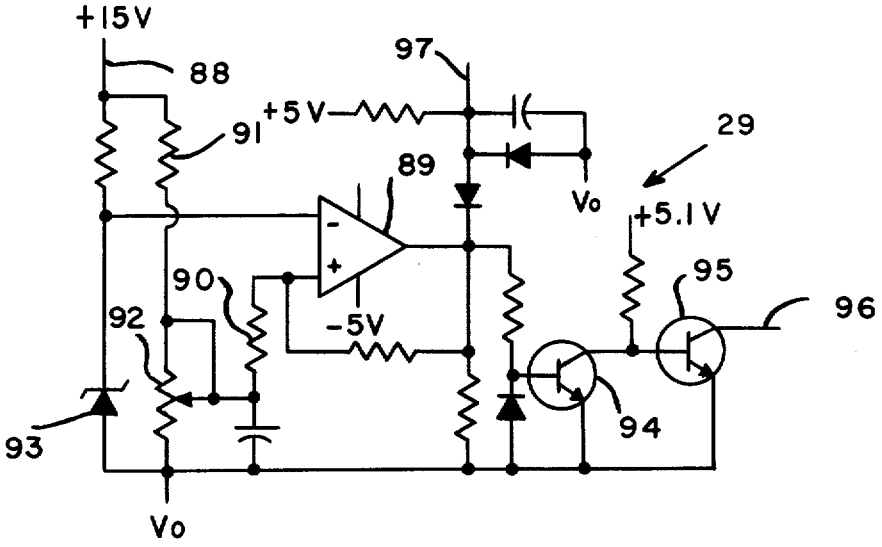
FIG. 5 is an electrical schematic diagram of the low voltage inhibit circuit.

In accordance with the present invention, for values of input voltage below 75 volts, no correction to the input voltage is attempted by the regulator for each half-cycle that such a value exists and thus the value of the output voltage essentially becomes that of the input voltage. Referring to FIG. 5, the low voltage inhibitor circuit 29 includes a connection 88 to the +15 v power supply terminal which thus provides a value of voltage related to the value of the input voltage. The plus terminal of the amplifier 89 is connected through a resistor 90 to a potential divider that includes a fixed resistor 91 and an adjustable resistor 92 and across which the +15 v is applied. A Zener diode 93, of 4.7 volts, is connected between $V_0$ and the minus terminal of amplifier 89. When the value of the +15 v supply that is related to the value of the input voltage produces a voltage value at the plus terminal of amplifier 89 which is more positive than the 4.7 volts produced by the Zener diode at the negative terminal, the output of amplifier 89 becomes positive. When the value of the input voltage decreases below a selected low value, the value of the voltage at the plus terminal becomes less positive than the voltage at the minus terminal and the output of the amplifier 89 becomes essentially ground. A transistor 94 having its base connected to the output of amplifier 89 is maintained conducting whenever the amplifier 89 output is positive and it, in turn, renders a transistor 95 non-conducting by its base being connected to the collector of transistor 94.

When the value of the input voltage decreases below the selected value, the voltage at the plus terminal of amplifier 89 decreases to less than the 4.7 volts at its minus terminal and the output of amplifier 89 accordingly becomes essentially ground. Transistor 94 then ceases conduction while transistor 95 shifts to conducting to place a lead 96 at essentially ground voltage. This ground voltage is utilized to prevent the applying of a gate triggering signal to the TRIACs of switches S6, S5, S2 and S1 while assuring that gate triggering signals will be applied to the TRIACs of switches S4 and S3.

As shown in FIG. 3, lead 96 is connected through a diode 966 to the anode of diode 83 of the optical isolator 82 of switch S6. The grounding of the anode prevents the optical isolator 82 from causing conduction in its emitter-collector path and hence inhibits the applying of a triggering signal to the gate of TRIAC 73. The other switches S5, S2 and S1 similarly have diodes 965, 962 and 961, respectively connected in parallel to the lead 96 and the anodes of their respective diodes so that these switches are prevented from conducting. The switches S4 and S3, however have their diodes 964 and 963 respectively connected to the cathode side of the diode 83 of the isolator 82 and effects conduction of the isolator when the lead 96 is low.

When actuated, the inhibiting circuit 29 changes the counter 67 count to 5 so that the count will correspond with the conduction of switches S4 and S3 and also will be ready to change in either direction after the input voltage has increased to its proper range. Two of the counters data input terminals are connected to +5 v while another two are connected to $V_0$ and the counter's 11 load terminal is connected by a lead 97, as shown in FIG. 5, to the output of amplifier 89. Upon the output of the amplifier 89 becoming essentially ground, the voltage in lead 97 shifts from high to low which instructs the counter to assume a 5 count because of the connections of its data input terminals. The counter will thus maintain the 5 count and cause conduction of switches S4 and S3 during the duration that the lead 97 is low. It should be noted that the low voltage inhibitor circuit functions upon initiation of operation of the regulator to set the counter to 5 which enables the regulator to correct in either direction in the next half-cycle.

Figure 6:
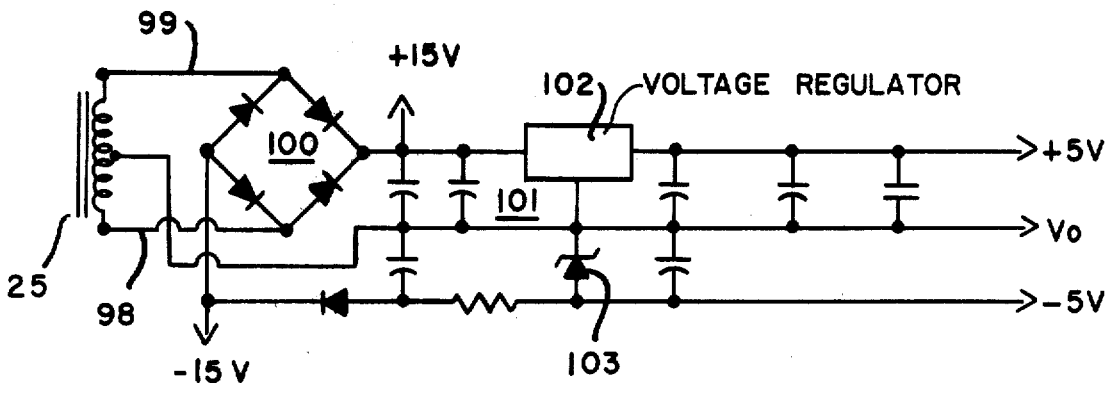
FIG. 6 is an electrical schematic diagram of a portion of the power supply circuit.

Referring to the portion of the power supply shown in FIG. 6, a pair of leads 98 and 99 are connected to some of the turns of a center-tapped winding 25 to provide 25 volts thereacross which is rectified by a rectifier 100. The −15 V pulsating DC voltage is obtained from the negative terminal of the rectifier as shown. A filter circuit indicated by the reference numeral 101 somewhat filters the full wave rectified voltage to provide the +15 V filtered voltage. Both the + and −15 V supplies have their voltage values change directly with changes in the value of the input voltage. A voltage regulator 102, which may be a type LM 309 and a Zener diode 103, of 4.7 volts, together with the components shown connected thereto are used to obtain the indicated logic voltages of + and −5 volts.

Figure 7:
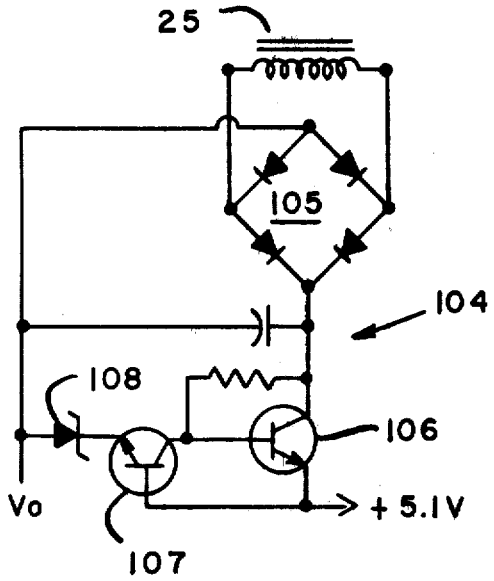
FIG. 7 is an electrical schematic diagram of another portion of the power supply circuit.

Another power supply 104 is shown in FIG. 7 and is used to supply the 5.1 volt power to the optical isolators 82 of the switches S1–S6 and the low voltage inhibit current quickly after initiating operation of the regulator. A full wave rectifier 105 is connected across a portion of winding 25 which provides about 13 volts across the rectifier 105. The plus terminal of the rectifier is connected through a transistor 106 to the +5.1 V output terminal. The base of transistor 106 is connected in the emitter-collector path of another transistor 107 which also includes a 4.7 volt Zener diode 108 while the base of transistor 107 is connected to the +5.1 V terminal. By the above structure, the transistor 106 is rendered conducting when the input voltage has a small value. The voltage of the +5.1 V terminal accordingly increases with the increasing input voltage until the Zener diode conducts which in turn initiates conduction of transistor 107 to maintain the voltage at +5.1 volts as the input voltage increases therebeyond.

In the operation of the regulator, there may occur an instance in which the correction for one half-cycle is such as to cause the output voltage to attain a value in the next half-cycle which the detector circuit determines is too great a correction and accordingly provides a signal to remove the correction for the next half-cycle. This, in turn, then causes the detector circuit to then sense that a correction is needed for the next half-cycle and it produces a signal for the same correction that was just eliminated in a prior half-cycle. The regulator thus "hunts" between correcting every other half-cycle while removing the correction on each intermediate half-cycle.

To avoid such a possibility, there may be included the anti-hunt circuit 28 specifically disclosed in FIG. 8 which prevents an opposite correction from occurring in adjacent half-cycles. The circuit 28 includes a pair of OR gates 109 and 110. One input of the former is connected to the lead 57a to receive the output of gate 57 while one input of the gate 110 is connected to the lead 58a to receive the output of gate 58. A monostable timer 111, which may be one-half of an integrated circuit type 74221, has its 1 trigger terminal connected to the lead 57a and its 13 output terminal connected as the other input to the gate 110. Similarly, the other half of the integrated circuit forms monostable timer 112 which has its 5 trigger terminal connected to the lead 58a and its 9 output terminal, connected as the other input to the gate 109. The digital output of the circuit 28 appears on the output leads 109a and 110a of gates 109 and 110.

When this anti-hunt circuit 22 is incorporated into the regulator 10, the leads 57a and 58a are connected to the inputs of gates 109 and 110 of the anti-hunt circuit instead to the inputs of the gates 65 and 66 of the switch control circuit 23 while output leads 109a and 110a are connected to the inputs of gates 65 and 66 in place thereof.

In the operation of the anti-hunt circuit, each timer 111 and 112 are set to provide a high output voltage for about 12½ milliseconds after receiving a triggering pulse, the latter being a count change signal. Upon the gate 109 receiving such a count change signal that appears on the lead 57a towards the end of the half-cycle, timer 111 applies a high logic level voltage as one input to the gate 110 which maintains the output thereof at a high level for the duration of the timer output. The duration of the output is selected to extend for about one and one-half half-cycles so that during the next half-cycle after a count changing signal has passed through gate 109, the gate 110 is incapable of passing a count changing signal that is opposite to the count changing signal just passed by gate 109. Similarly, whenever a count changing signal appears on the lead 58a, the timer 112 provides a high logic level voltage to the gate 109 to prevent it from changing its output to pass an opposite count changing signal for the next half-cycle. For a fuller description of the "hunting" phenomena, reference is made to U.S. Pat. No. 3,970,918.

As shown in FIG. 3, the regulator further includes a high voltage protection circuit for limiting high voltages that may be induced in the secondary windings 17a–17d by failure of a TRIAC, fuse, high input transient voltage, etc. The protection circuit includes a TRIAC 113 and voltage sensitive switch 114, silicon bilateral trigger type 1N5761A, connected as shown across the winding 17c. When the voltage across the winding 17c and hence the TRIAC 113 exceeds for example 400 volts, the switch 114 triggers to supply a triggering signal to the TRIAC to effect short-circuiting of the winding 17c. When short-circuited, the winding supplies flux in the core that opposes that produced by the secondary winding to thereby limit high voltages from being induced in the other primary windings.

The operational amplifiers 35, 38, 40, 43, 51 and 89 may be type 72558; the gates 57, 58, 71 and 72, type 7400; and the gates 65, 66, 109 and 110, type 7432.

While the above described regulator relates to having a 115 volt output, different voltages may be controlled if desired. Thus, to adapt the regulator from one voltage to another, essentially only changes in the number of turns in the windings of the transformers 16, 19 and 24 are required.

It will accordingly be understood that there has been disclosed a stepping voltage regulator which though economical to manufacture, is quick acting in providing the necessary correcting voltage to maintain a value of output voltage within a range of a nominal selected value. The regulator utilizes a transformer that adds to the input voltage any one of either of two different values of boosting voltage or two different values of bucking voltage or if the input voltage is within the desired output voltage value range, no correction. The transformer includes four energizable windings with one or two being energized simultaneously at the beginning of each half-cycle in order to maintain the proper peak value of the output voltage. Moreover, the correcting voltage is limited to being changed in a half-cycle to only one of the two values of correction or non-correction that are mathematically adjacent the correction that was applied during the previous half-cycle.

Variations and modifications may be made within the scope of the claims and portions of the improvements may be used without others.

I claim:

1. A stepping voltage regulator comprising a pair of input terminals connectable to a source of AC power, a pair of output terminals connectable to a load, a pair of lines connecting the two pair of terminals, a transformer having a secondary winding connected in series in one line and having *at least* four primary windings, a first primary winding being connected [through a first switch] *in a first series circuit* from one line *through a first switch* to the other line, a second primary winding being connected [through a second switch] *in a second series circuit* from *said* one line *through a second switch* to the other line, a third primary winding having one end connected through a third switch to the [end of] *first series circuit between* the first winding *and the first switch,* a fourth primary winding having one end connected through a fourth switch to the [end of] *second series circuit between* the second winding *and the second switch* , said one end of the third *winding* and *said one end of the* fourth [windings] *winding* having a common junction, a fifth switch connected between the other end of the third winding and the other line, a sixth switch connected between the other end of the fourth winding and the other line, [each of said windings having the same number of turns,] said first and third windings when energized inducing one direction of correcting voltage in the secondary winding and said second and fourth windings inducing the opposite direction of correcting voltage, switch control means for providing a *selected* conduction state [of only one of either] *among plural conduction states of said switches including at least* (*a*) the first switch only, [or] (*b*) *only* the third and fifth switches simultaneously, [or] (*c*) *only* the fifth and sixth switches simultaneously, [or] (*d*) *only* the fourth and sixth switches simultaneously [or] *and* (*e*) the second switch only, and detector means for sensing the value of the output voltage and providing a correcting signal to the switch control means to cause the switch control means to change to a different conduction state when the value of the output voltage exceeds a selected range of values.

2. The invention as defined in claim 1 in which the detector means provides the correcting signal for the next half-cycle, in which the switch control means includes means for receiving the correcting signal for changing to the different conduction states for the next half-cycle and in which the different conduction state is limited to the state that is immediately adjacent the conduction state for the present half-cycle in the above set forth listing of the conduction states.

3. The invention as defined in claim 2 in which the means for receiving the correcting signal includes an incremental counter having at least five different sequential counts with the correcting signal altering the counter count to the next count in the sequence, in which the switch control means includes decoding means for providing a different switching signal for each different count and in which the switch control means effects a different conduction state for each different switching signal.

4. The invention as defined in claim 3 in which each correcting signal consists of either an increment up signal or an increment down signal and in which the counter alters its count by one count in accordance with the direction of the correcting signal.

5. The invention as defined in claim 3 in which each of the conduction states has a corresponding counter count and in which the corresponding counter counts are positioned in the same sequence as the sequence of the conduction states listed above whereby each switching signal produces only a change from [its present conducting] *the conduction* state *of the present half-cycle* to a [conducting] *conduction* state immediately adjacent thereto in the above listing *of conduction states.*

6. The invention as defined in claim 1 in which the detector means senses the peak value of the output voltage for each half-cycle and provides a correcting signal towards the end of the half-cycle if the peak value of the output voltage deviates from the selected range of output voltage values.

7. The invention as defined in claim 6 in which the detector means includes means for providing an essentially constant value of reference voltage, means for providing a value of voltage related to the peak value, means for comparing said two voltages and providing an indication when there is a definite difference therebetween and means for preventing the production of the indication until the last quarter of each half-cycle.

8. The invention as defined in claim 7 in which there is timing means for receiving the indication and producing the correcting signal for each occurrence of an indication, said timing means including a clock means for limiting the producing of the correcting signal to within the last 10% of each half-cycle.

9. The invention as defined in claim 7 in which the detector means includes a capacitor, means for charging the capacitor to a peak voltage value related to the peak value of the output voltage, said capacitor charge being related to the value of the voltage that is compared to the reference voltage with said charge tending to decay while awaiting the production of the indication and means for adding to the charge of the capacitor only for values of output voltage that require an increasing correction.

10. The invention as defined in claim 1 in which each switch includes a semi-conductor element capable of conducting current in either one of two different directions upon receipt of a gate signal and in which there is a gate signal producing means for providing a gate signal upon receipt of a conducting signal from the switch control means, said gate signal producing means including an optical isolator for electrically isolating the conducting signal from the current through the semiconductor element.

11. The invention as defined in claim 1 in which there is a low voltage inhibit circuit connected to provide an inhibit signal upon the value of the input voltage decreasing below a selectable value and means in the switch control means for receiving the inhibit signal and preventing conduction of the first four switches while causing conduction of the fifth and sixth switches when the input voltage is below the selectable value.

12. The invention as defined in claim 11 in which the low voltage inhibit circuit includes means for providing a signal to the switch control means to assume the conduction state of the fifth and sixth switches that are simultaneously conducting.

*13. The invention as defined in claim 1 in which the switch control means includes an incremental counter that is adapted to count up or down dependent on the polarity of the correcting signal and that has a capacity of at least five different sequential counts, and in which the switch control means includes means for limiting change of the count in the counter in response to any correcting signal to the next count in the sequence, and in which the switch control means includes means for providing a different decoded switching signal for each different count and for bringing into effect a different conduction state for each different switching signal.*

*14. The invention as defined in claim 13 in which the detector includes a reference voltage and means for comparing the sensed output voltage and the reference voltage and for providing said correcting signal only when the difference between said voltages exceeds a predetermined threshold.*

*15. The invention as defined in any of claims 1, 2, 6, 11 or 13 wherein the number of turns in all said primary windings are at least approximately equal.*

* * * * *